United States Patent
Bottome

(10) Patent No.: US 8,636,464 B2
(45) Date of Patent: Jan. 28, 2014

(54) ADJUSTABLE FAN CASE LINER AND MOUNTING METHOD

(75) Inventor: Kristofer J. Bottome, Nottingham (GB)

(73) Assignee: Rolls-Royce PLC, London (GB)

( * ) Notice: Subject to any disclaimer, the term of this patent is extended or adjusted under 35 U.S.C. 154(b) by 732 days.

(21) Appl. No.: 12/838,752

(22) Filed: Jul. 19, 2010

(65) Prior Publication Data

US 2011/0044807 A1 Feb. 24, 2011

(30) Foreign Application Priority Data

Aug. 24, 2009 (GB) .................................. 0914679.6

(51) Int. Cl.
*F04D 29/40* (2006.01)

(52) U.S. Cl.
USPC ..................... 415/128; 415/173.2; 415/173.3; 415/173.4; 415/196

(58) Field of Classification Search
USPC ............. 415/128, 170.1, 173.1, 173.2, 173.3, 415/173.4, 196
See application file for complete search history.

(56) References Cited

U.S. PATENT DOCUMENTS

| | | | |
|---|---|---|---|
| 5,056,988 A * | 10/1991 | Corsmeier et al. | 415/173.2 |
| 5,096,375 A * | 3/1992 | Ciokailo | 415/173.2 |
| 5,456,576 A * | 10/1995 | Lyon | 415/173.3 |
| 5,704,614 A * | 1/1998 | Sanders et al. | 277/303 |
| 6,547,522 B2 * | 4/2003 | Turnquist et al. | 415/173.3 |
| 2007/0003411 A1* | 1/2007 | Manzoori | 415/173.2 |

FOREIGN PATENT DOCUMENTS

| | | |
|---|---|---|
| EP | 1 270 876 A2 | 1/2003 |
| EP | 1 741 880 A2 | 1/2007 |
| GB | 869908 | 6/1961 |
| GB | 2 235 731 A | 3/1991 |
| GB | 2 240 818 A | 8/1991 |
| GB | 2 440 744 A | 2/2008 |

OTHER PUBLICATIONS

Search Report in British Application No. 0914679.6, dated Dec. 1, 2009.

\* cited by examiner

*Primary Examiner* — Igor Kershteyn
(74) *Attorney, Agent, or Firm* — Oliff & Berridge, PLC

(57) ABSTRACT

A liner for an interior surface of an engine casing, comprises a number of liner panels disposed radially outwardly of a rotatable component of the engine, such as a fan blade, and the panels are mounted on the interior surface of the casing, wherein each panel is individually adjustable, such that the clearance between the panel and the rotatable component of the engine may be varied individually for each panel.

14 Claims, 3 Drawing Sheets

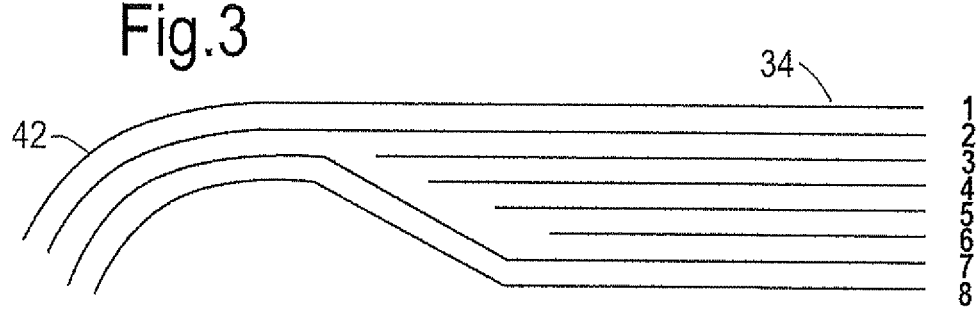
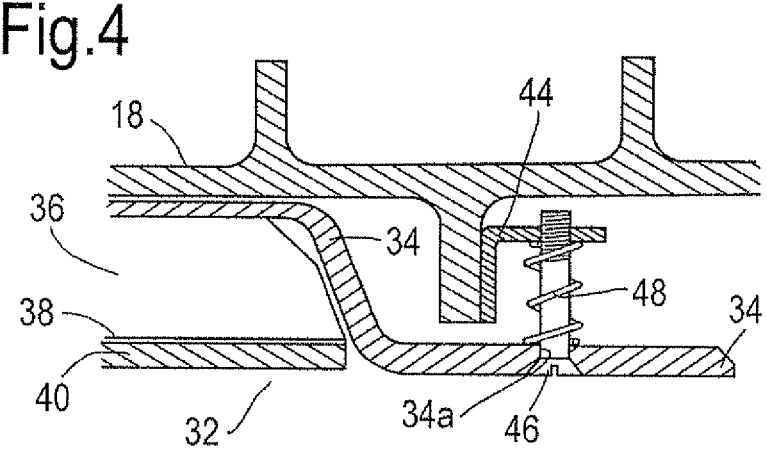
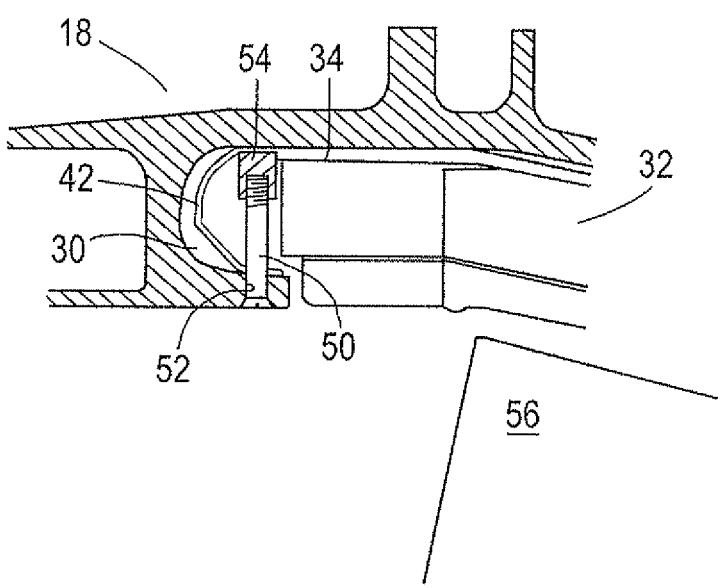

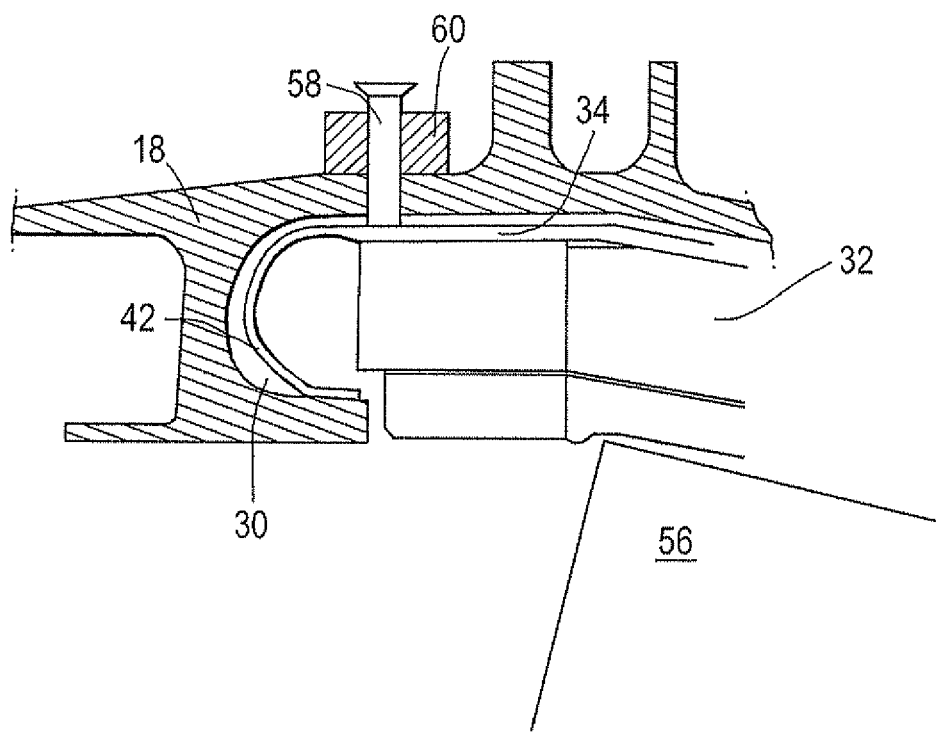

ADJUSTABLE FAN CASE LINER AND MOUNTING METHOD

The present invention relates to a liner for a fan case of an aero engine, and to a method of mounting such a liner, and is concerned particularly with an adjustable liner and to a method of mounting the same.

In a ducted fan, such as is commonly used in an aero engine, for example, a fan is disposed co-axially within a duct and is driven to rotate within the duct to direct air rearwardly through the duct.

For efficiency and stability of the fan blades the gaps between the tips of the blades and the inner casing of the duct within which the fan rotates must be kept to a minimum so as to minimise leakage of air around the tips of the blades.

However, with smaller clearances between the blade tips and the duct casing comes the likelihood that some rubbing between the two will take place in certain operating conditions. For example, when the speed of rotation of the fan increases the blades can elongate due to centrifugal forces. Also, for an aero engine, during certain maneuvers of the aircraft gyroscopic effects may temporarily cause the fan and duct to come out of perfect axial alignment which can lead to rubbing of the blade tips against the casing.

To accommodate this rubbing, the duct casing is provided with a lining comprising a sacrificial abradable layer which is designed to be cut or rubbed away by the blade tips. The liner is sometimes referred to as a Fan Track Liner (FTL), and consists of a number of arcuate panels arranged circumferentially around the inside of the duct case. The panels typically include several layers bonded together, one above the other in a radial direction.

In a previously considered approach a fan track liner construction employs four stages (from front to back) of outer aluminium honeycomb panels that are bonded to the interior of the casing with epoxy adhesive. The honeycomb cell sizes of the panels are optimised for containment of debris. Bonded to the outer FTL panels is a septum layer which comprises laminates of glass fibre sheet. The number of laminates in the septum layer is determined by the requirements for absorbing the impact from projectile ice. Finally, an inner liner comprises five rows of filled Nomex® honeycomb panels bonded to the septum layer.

On certain engines, the liners upstream above the fan blade, have a soft, abradable filler. The liners in the down-stream, potentially ice-impact area, employ a harder filler. Removal of the FTL panels of the kind described above involves scraping away the liner material. This can cause some accidental damage to the case itself and so its walls must be made thicker to compensate. Typically, to provide such so-called "repair tolerances" the titanium alloy walls of the case must be made thicker by as much as 0.6-1 mm.

An alternative proposed construction involves the use of cassette liners. The basic principle of a cassette liner is that of a liner tray, or cassette, which is attached to the fan case via bolts at its front and rear edges, rather than a liner which is bonded directly to the fan case. The rest of the liner is constructed as before but is bonded to the cassette tray rather than to a backing sheet.

Although a previously considered cassette liner solution adds weight over the traditional panel, it provides benefits in terms of easier removal and fitting and also obviates the need to include repair tolerances in the fan case. However, the previously proposed cassette liner system has a number of disadvantages. Firstly, the fan containment system cavity which is provided at the front of the fan case in a hook-shaped recess and is for accommodating a portion of fan blade in a "fan blade off" (FBO) event, becomes partially filled by the number of fasteners, such as bolts, which are needed to retain the cassette in place. Secondly, the time taken to install the cassette liners is significant and tolerance effects due to bolting and "floating" parts is necessarily and undesirably increased.

An alternative proposal is described in European Publication no. EP 1270876 A2 in which an annular abradable seal for a turbine is provided with a spring mounting to maintain the abradable seal adjacent to the tip of a rotatable component within the turbine, thereby minimising clearance and hence optimising efficiency.

One problem common to all previously considered FTL systems is that of imperfect alignment between the circumferentially adjacent individual arcuate panels of the FTL. This can result from uneven wear during operation of the engine, or for example due to manufacturing tolerances. If adjacent FTL panels are not aligned properly, such that a step profile exists between adjacent panels, then a greater clearance must be provided between the FLT and the tips of the rotating components, i.e. the fan blades. Any such increase in clearance necessarily impairs the efficiency of the fan.

The present invention aims to provide a fan case liner, and a method of installing the same, in which at least some of the above mentioned problems are at least partially overcome.

The present invention is defined in the attached independent claims, to which reference should now be made.

Further, preferred features may be found in the subclaims appended thereto.

According to the invention there is provided a liner for an interior surface of an engine casing, the liner comprising at least one liner panel disposed radially outwardly of a rotatable component of the engine, and mounting means arranged to mount the panel on the interior surface of the casing, wherein the mounting means are adjustable such that the clearance between the panel and a rotatable component of the engine may be varied.

There is preferably provided a plurality of liner panels wherein each panel is provided with respective adjustable mounting means, such that the clearance between the panel and a rotatable component of the engine may be adjusted individually for each panel.

The or each panel is preferably mounted resiliently on the surface of the casing.

In a preferred arrangement the or each panel comprises a backing tray and at least one layer bonded thereto wherein the backing tray comprises a sprung portion which is locatable in a recess of the casing.

The sprung portion of the tray is preferably located at a front, forward or upstream edge of the panel.

In a preferred arrangement the or each panel comprises a plurality of layers including at least one layer which is arranged to be abradable by contact with a rotatable component of the engine.

The mounting means may include at least one threaded member which can be turned to vary the clearance between the or each panel and the rotatable component of the engine.

Preferably the threaded member cooperates with a spring that is arranged to bias the panel in a radial direction with respect to a rotatable component of the engine.

The liner may comprise a fan liner for an aero engine, wherein the clearance between the or each liner panel and blades of a rotatable fan of the engine can be varied by adjusting the mounting means.

The invention also includes a liner panel for lining an interior surface of an engine casing and arranged to be disposed radially outwards of a rotatable component of the engine, wherein the panel includes adjustable mounting means arranged to vary the clearance between the panel and a rotatable component of the engine.

The panel may comprise a sprung portion for locating in a recess of the casing and at least one abradable layer arranged to be abradable by a rotatable component of the engine.

The invention also includes a method of mounting a liner panel on an interior surface of an engine casing, the method comprising locating the panel on an interior surface of the casing, radially outwardly with respect to a rotatable component of the engine, and securing it with adjustable mounting means, such that adjustment of the mounting means allows the clearance between the panel and the rotatable component to be varied.

The method may include locating a sprung portion of the panel in a recess of the casing.

Preferably the method includes turning at least one threaded member to vary the clearance between the panel and the rotatable component.

The method may comprise a method of mounting a fan liner panel for an aero engine.

The invention also includes an aero engine comprising a liner or liner panel according to any statement herein.

Preferred embodiments of the present invention will now be described, by way of example only, with reference to the accompanying diagrammatic drawings in which:

FIG. 3 is a schematic view of part of a fan track liner shown in FIG. 2;

FIG. 4 is a sectional view of a rear part of the casing of FIG. 1;

FIG. 5 is a cross-section through a front part of a casing according to a second embodiment of the invention, and FIG. 6 is a cross-section through a front part of a casing according to a third embodiment of the invention.

Figure 1:
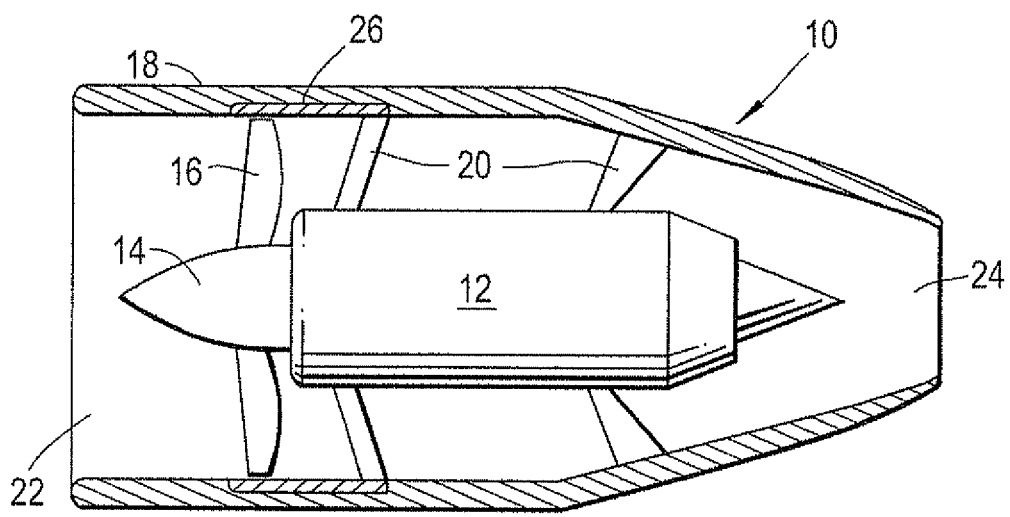
FIG. 1 shows schematically a turbofan aero engine.

Turning to FIG. 1, this shows schematically generally at 10 a turbofan aero engine comprising a core 12 which provides drive to a rotary fan 14 having a plurality of circumferentially spaced fan blades 16 thereabout. A nacelle surrounds the core 12 and is mounted thereon by struts 20. The nacelle has an inlet 22 and an exhaust nozzle 24 and forms a duct casing 18 around the fan 14. In use, air is drawn in via the inlet 22 and compressed by the fan 14. Some of the compressed air is fed into the core 12 which includes further compressor stages, a combustor and a turbine which drives the fan 14 (none of which are shown). The rest of the air, so called bypass air, is ducted around the outside of the core 12 and through the exhaust nozzle 24.

In the interests of efficiency and of stability of the fan blades 16 leakage of air around the tips of the blades 16 should be kept to a minimum. Typically the blades have only a few millimetres of clearance between their tips and the inside surface of the duct casing 18. Circumferentially adjacent arcuate panels (shown hatched), comprising a sacrificial layer of abradable material, form a fan track liner (FTL) 26 around the inside of the duct casing 18.

Figure 2:
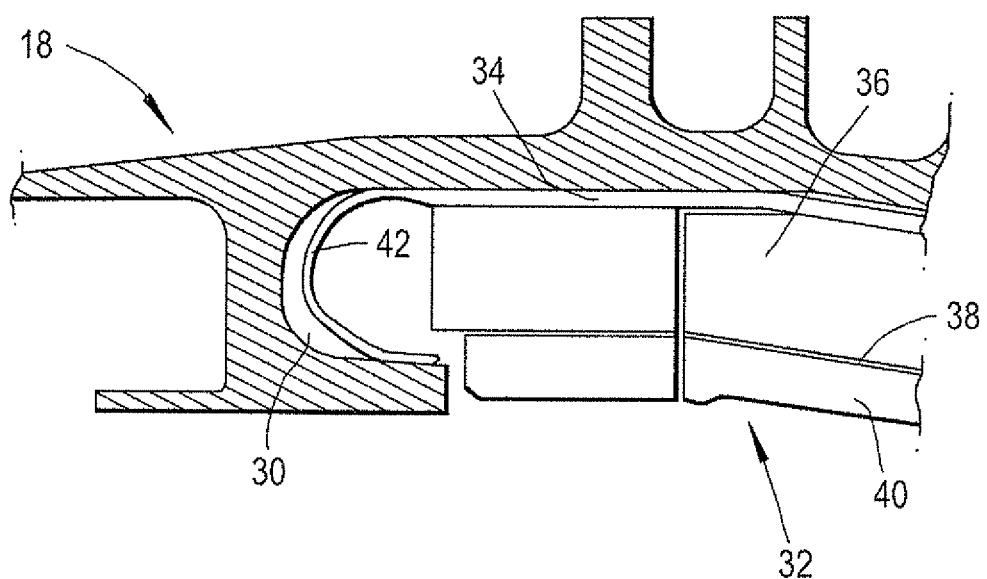
FIG. 2 is a cross-sectional view through a front part of a casing of the turbofan engine of FIG. 1, in accordance with an embodiment of the present invention.

FIG. 2 shows in detailed sectional view a front, or forward portion of inner wall of the duct casing 18 in the region shown hatched in FIG. 1. The inner wall of the casing 18 defines a hook shaped arcuate recess 30 that is provided to accommodate a detached portion of fan blade (not shown) such as could be released in a fan blade off (FBO) event.

Mounted within the casing 18 is an abradable liner panel 32 in the form of a cassette. FIG. 2 shows a front, or forward portion of the cassette which has a rigid tray backing portion 34 of composite ply material, an aluminium honeycomb layer 36, a septum 38 of glass fibre and a Nomex® honeycomb layer 40. The layers 36, 38 and 40 are bonded together and bonded to the tray 34.

The front of the tray 34 has a resilient sprung section 42 which comprises a reduced number of plies and thus has reduced stiffness. The sprung section 42 wedges into the hook shape recess 30 and is held therein at its front edge.

FIG. 3 shows schematically the reduction of the number of plies of the tray 34 as it forms the sprung section 42. The shape of the forward sprung section 42 can be a simple e.g. circular, shape or else can be a more complex shape as is shown in the example of FIG. 2. The plies numbered 3-6 in the drawing are internal and are staggered before the curved sprung section 42. There can be an even or odd number of plies.

The tray backing portion 34 has been described as being made of composite ply material, and this would typically comprise glass fibre or carbon fibre with an epoxy or similar matrix; although any other suitable composite material may be used. The skilled reader will understand, however, that other materials may be used for the tray backing portion 34, and in particular that it may be made from metal. In this case the reduced stiffness of the forward sprung section 42 could be achieved by, for example, using a reduced thickness of metal in this section.

Turning to FIG. 4, this shows a rear portion of the abradable liner panel 32. A rigid bracket 44 is mounted to a portion of the casing 18, and countersunk screws 46 pass through holes 34a in tray 34 and threadedly engage the bracket 44 to retain the tray in place. Springs 48 are positioned between the tray 34 and bracket 44, through which the screws pass. The springs 48 keep the tray 34 spaced from the bracket 44 at a position dictated by the screws 46. Locking nuts (not shown) may optionally be used to secure the screws on the bracket.

The screw and spring arrangement at the rear of the panel 32 allows its position relative to the fan blade (not shown) to be adjusted. If the screws 46 are tightened the panel 32 moves away from the tip of the fan blade. If the screws 46 are loosened the clearance between the panel 32 and the tip of the fan blade becomes reduced.

FIG. 5 shows an alternative embodiment in which the front of the panel is also adjustable. Screws 50 pass through holes 52 in the casing and slots (not shown) in the sprung section 42 of the tray 34 to engage threaded blocks 54 attached to the tray 34. Tightening of the screws 50 causes the sprung section 42 to become compressed which in turn has the effect of moving the panel 32 towards the tip of the fan blade, represented here at 56. Conversely, when the screws 50 are loosened, the sprung section 42 pushes the panel 32 further from, the tip of the fan blade 56, thereby increasing the clearance between the two.

FIG. 6 shows a further alternative embodiment. As with the embodiment of FIG. 5, this arrangement adjusts the clearance of the front of the panel 32 with respect to the fan blade 56. However, in this embodiment the screws 56 each pass through a boss 60 mounted on the fan case 18. A portion of the hole in the boss 60 is threaded with a locking insert (not shown) that prevents the screw 58 turning of its own accord. Tightening of the screws 58 causes them to push against the tray 34 which in turn forces the panel 32 to move towards the fan blade 56, compressing the sprung section 42. Conversely, loosening the screws 58 allows the sprung section 42 to push the panel 32 away from the tip of the blade 56 thereby increasing the clearance between the two.

The above described systems for adjusting the front and rear of the panel may be combined, or may be employed separately, to provide liner panels which can be adjusted individually for optimum clearance from the tip of the fan blade.

Advantages of the adjustable panels according to the present invention include minimising the requirement for inbuilt tolerances, which are needed conventionally for non-adjustable parts.

In addition, the panels 32 are sprung, that is the FTL is resilient, and accordingly any debris from a collision, including an FBO event, can be absorbed by the springs/sprung sections, potentially deflecting the liner panel locally and thereby creating space for the debris to pass. This also allows for ice shedding provisions, in which the case liner must be able to withstand projectile ice, to be met with a lower-strength material which can be selected for better abrasion and/or sealing qualities.

The invention claimed is:

1. A liner for an interior surface of an engine casing, the liner comprising:
   at least one liner panel disposed radially outwardly of a rotatable component of the engine,
   the panel including:
      a sprung portion at a front, forward, or upstream edge of the panel which is locatable in a recess of the casing, and
      at a rear or downstream edge of the panel, a means for mounting that mounts the panel on the interior surface of the casing, wherein
   the means for mounting are adjustable such that a clearance between the panel and the rotatable component of the engine may be varied.

2. A liner according to claim 1, comprising
   a plurality of liner panels, wherein
   each panel is provided with respective adjustable means for mounting, such that the clearance between the panel and the rotatable component of the engine may be adjusted individually for each panel.

3. A liner according to claim 1 wherein the or each panel is mounted resiliently on the surface of the casing.

4. A liner according to claim 1, wherein the or each panel comprises a plurality of layers including at least one layer which is arranged to be abradable by contact with the rotatable component of the engine.

5. A liner according to claim 1 wherein the means for mounting include at least one threaded member which can be turned to vary the clearance between the or each panel and the rotatable component of the engine.

6. A liner according to claim 5 wherein the threaded member cooperates with a spring that is arranged to bias the panel in a radial direction with respect to the rotatable component of the engine.

7. A liner according to claim 1 comprising a fan liner for an aero engine, wherein a clearance between the or each liner panel and blades of a rotatable fan of the engine can be varied by adjusting the means for mounting.

8. An aero engine comprising a liner or liner panel according to claim 1.

9. A liner panel for lining an interior surface of an engine casing, the panel comprising:
   the panel being arranged to be disposed radially outwards of a rotatable component of the engine,
   a sprung portion at a front, forward or upstream edge of the panel which is locatable in a recess of the casing, wherein
   at a rear or downstream edge of the panel, an adjustable means for mounting is arranged to vary a clearance between the panel and the rotatable component of the engine.

10. A panel according to claim 9 wherein the panel comprises
    the sprung portion for locating in a recess of the casing, and
    at least one abradable layer arranged to be abradable by a rotatable component of the engine.

11. A method of mounting a liner panel on an interior surface of an engine casing, the method comprising
    locating the panel on the interior surface of the casing, radially outwardly with respect to a rotatable component of the engine,
    locating a sprung portion at a front, forward or upstream edge of the panel in a recess of the casing, and
    securing a rear or downstream edge of panel, with an adjustable means for mounting, such that adjustment of the means for mounting allows a clearance between the panel and the rotatable component to be varied.

12. A method according to claim 11 wherein the method includes turning at least one threaded member to vary the clearance between the panel and the rotatable component.

13. A method according to claim 11 comprising a method of mounting a fan liner panel for an aero engine.

14. A liner for an interior surface of an engine casing, the liner comprising:
    at least one panel disposed radially outwardly of a rotatable component of the engine,
    the panel including:
       a sprung portion at a front, forward, or upstream edge of the panel which is locatable in a recess of the casing, and
       at a rear or downstream edge of the panel, a fastener that mounts the panel on the interior surface of the casing, wherein
    the fastener is adjustable such that a clearance between the panel and the rotatable component of the engine may be varied.

* * * * *